(12) United States Patent
Fretter et al.

(10) Patent No.: US 11,457,145 B2
(45) Date of Patent: Sep. 27, 2022

(54) SYSTEM AND METHOD FOR PRODUCING A SPATIALLY HIGHLY PRECISE, LOCALIZED PANORAMIC STREET IMAGE

(71) Applicant: Parkling GmbH, Berlin (DE)

(72) Inventors: Christoph Fretter, Berlin (DE); Detlev Huelsebusch, Berlin (DE); Oleg Selig, Berlin (DE)

(73) Assignee: Parkling GmbH, Berlin (DE)

( * ) Notice: Subject to any disclaimer, the term of this patent is extended or adjusted under 35 U.S.C. 154(b) by 0 days.

(21) Appl. No.: 17/232,731

(22) Filed: Apr. 16, 2021

(65) Prior Publication Data
US 2021/0360156 A1  Nov. 18, 2021

(30) Foreign Application Priority Data

May 15, 2020 (EP) ..................... 20174906

(51) Int. Cl.
 *H04N 5/232* (2006.01)
(52) U.S. Cl.
 CPC ..... *H04N 5/23238* (2013.01); *H04N 5/23229* (2013.01)
(58) Field of Classification Search
 None
 See application file for complete search history.

(56) References Cited

U.S. PATENT DOCUMENTS

| | | | | |
|---|---|---|---|---|
| 2005/0111753 A1* | 5/2005 | Peleg | ................... | G06V 10/147 382/284 |
| 2005/0117779 A1* | 6/2005 | Horie | ................... | G06V 40/162 382/103 |
| 2007/0076016 A1 | 4/2007 | Agarwala et al. | | |
| 2008/0187181 A1 | 8/2008 | Meadow et al. | | |
| 2011/0043604 A1* | 2/2011 | Peleg | ................... | G06T 3/4038 348/E7.001 |
| 2020/0143164 A1* | 5/2020 | Schultz | ................... | G01S 19/39 |

FOREIGN PATENT DOCUMENTS

| | | | | |
|---|---|---|---|---|
| CN | 109767464 A | * | 5/2019 | |
| JP | 2008057243 A | * | 3/2008 | |
| RU | 2598808 C2 | * | 9/2016 | ............. G06F 16/29 |
| WO | WO-0138896 A1 | * | 5/2001 | ............... B64G 1/36 |
| WO | WO0161985 A2 | | 8/2001 | |

OTHER PUBLICATIONS

European Search Report for corresponding European Patent Application No. EP 20174906.6 dated Oct. 8, 2020 (in German).

* cited by examiner

*Primary Examiner* — Shadan E Haghani
(74) *Attorney, Agent, or Firm* — Harness, Dickey & Pierce, P.L.C.

(57) ABSTRACT

The invention relates to a method for producing a spatially highly precise, localized panoramic street image of a street from a continuous film with location information recorded by means of a vehicle, wherein the film contains image data at an angle of 90° to the course of the street, which is referred to as zero position, and has a capture angle of at least 20° in the horizontal. Here, for each frame of the film recording positions are ascertained and afterwards, in an analysis step, the physical distance between the recording positions of a first and a subsequent frame is calculated. Following this, image strips are extracted from the first and the subsequent frame, which correlate with the distance. Furthermore, the invention relates to a system for executing the relevant method according to the invention.

20 Claims, 4 Drawing Sheets

SYSTEM AND METHOD FOR PRODUCING A SPATIALLY HIGHLY PRECISE, LOCALIZED PANORAMIC STREET IMAGE

CROSS REFERENCE TO RELATED APPLICATIONS

This application claims priority to European Patent Application No. 20 174 906.6, filed May 15, 2020. The entire disclosure of the above application is incorporated herein by reference.

TECHNICAL FIELD

The invention relates to a system and method for producing a spatially highly precise, localized panoramic street image of a street from a continuous film with location information recorded by means of a vehicle.

BACKGROUND

As a result of the population growth in urban regions, traffic is increasing, in particular also the individual traffic in passenger cars. Especially in inner-city areas, this massive increase in vehicle traffic density leads to problems which cause a shortage of parking spaces that can no longer be solved by simple means. Further problems are not only the concomitant increased noise pollution through increased vehicle traffic, but also the exposure to airborne contaminants caused by increased vehicle traffic which, in the meantime, is being increasingly regarded with concern.

Studies have shown that approximately 30% of inner-city traffic is not classical transportation traffic but rather can be ascribed simply to vehicles driven by individuals in search of a parking space.

Projections for Germany alone reveal that 1.9 billion hours are spent on vehicles being driven by individuals who are simply searching for parking spaces. For this, 3.2 billion liters of fuel are consumed. All in all, an economic loss in the amount of 40.4 billion Euro is assumed.

Therefore, the call for a parking space management system and method that reduces this excessive vehicle traffic in search of parking spaces makes its presence felt to an increasing extent.

In the case of such any type of parking management systems, a basic distinction is made between two states of data ascertainment which are needed. On the one hand, static data would have to be obtained, which indicate not only where parking spaces are located, but at which times parking in these parking spaces is permitted, also which also provide information as to how the parking spaces are to be parked in, e.g., as lengthways or cross-wise parking. This static data also needs to include information about no-parking zones as well as possible parking fees. Such data are referred to as "static data" and constitute the fundamental prerequisite for a parking space management system. The second state of data ascertainment resides in ascertaining so-called "dynamic data" which represent information on the current parking space occupancy situation.

One possibility of ascertaining static data is known from DE 10 2018 214 510 A1, for example. In this case, however, only information as to whether a parking space is available or not can be ascertained. Data indicating at which times parking is permitted or whether a given parking space is a driveway, for example, can only be established with great difficulty.

On the one hand, it is known from the Google STREET VIEW® application, for example, that by means of using vehicles, georeferenced panoramic images, i.e., 360° images, are produced from different positions in a street. However, such data are not enough to generate sufficient information required for the calculation of static parking space data. For instance, the positions of individual permitted parking spaces cannot be ascertained at all or only with great difficulty. Similarly, data on allowed parking times and the like are often not visible either.

For this reason, the suggestion is made in the unpublished European patent application 20 159 008.0 that a continuous film is produced instead of making individual recordings of a street. However, from the film itself, no information whatsoever, and in particular no static information concerning the parking space situation, can be gathered.

The invention of the present disclosure is therefore based on the object to provide a method and a system to produce, from a continuous film of a street panorama, a panoramic street image which can serve, in particular, to ascertain static data for vehicle parking spaces.

In accordance with the invention, this object is achieved by a method having the features of the appended claims.

Advantageous embodiments of the invention are apparent from the appended claims, the following description, as well as the Figures and their explanation.

SUMMARY

In accordance with the method pursuant to the invention, a film is used in which image data at an angle of 90° to the movement direction of the vehicle, or rather to the course of the street, are present in each frame of the film. This angle or area is hereinafter referred to as "zero position". Furthermore, the film has a capture angle of at least 20° in the horizontal, wherein at least 5° of the capture angle are present before and after the zero position. By means of the location information, a precise recording position is ascertained for each frame in the film. Afterwards, in an analysis step, the physical distance between the recording position of a first frame and a subsequent frame is calculated. Then an image strip of the first frame from the zero position in the direction of the recording position of the subsequent frame, which corresponds with a first part of the distance, and an image strip of the subsequent frame from the zero position in the direction of the recording position of the first frame, which corresponds with a second part of the distance, are used to produce the panoramic street image. In doing so, the first and the second part of the distance are chosen such that together they correspond to the entire distance between the two recording positions.

A fundamental idea of the invention can be considered to reside in the fact that the film is divided into its individual frames. Subsequently then, each frame is processed, i.e., evaluated individually or together with the adjacent frames, to produce a highly precise, localized panoramic street image. In conjunction with this, the realization was made, according to the invention, that especially the area around the zero position in each frame shows no or hardly any optical distortions. The image data located in the area of the zero position are therefore particularly suitable to produce a panoramic street image that is of high precision and has no optical distortions as far as possible. This means that, in particular, distances and angles are not, or hardly, distorted. Based on this quality, panoramic street image distances and dimensions can thus be ascertained that predominantly correspond to reality.

The film recorded for the method according to the invention can be recorded, for example, through a side window of the vehicle. In doing so, it is essential that the zero position is present on the film. The zero position precisely corresponds to the area in a frame which lies perpendicularly to the direction of travel of the vehicle, or rather perpendicularly to the course of the street that the vehicle is travelling on, and is thereby precisely recorded by the camera without any optical distortions. Moreover, as set out previously, according to the invention, account is taken of the fact that it is precisely this area which is suitable to produce the panoramic street image. Therefore, it is necessary that in the film an area on both sides of the zero position is present as far as possible.

Furthermore, when producing the panoramic street image it is possible to use image data in each case, i.e., image strips that extend over the entire height of the film, or rather of each frame, in order to assemble the panoramic street image. The entire height is defined here by the vertical capture angle of the camera.

Ideally, a vehicle used for the production of the film moves at a constant speed along a street. However, this is an idealistic conception. Therefore, according to the method pursuant to the invention, the distance between the recording position of two adjacent frames is ascertained. In particular, this is the physical distance of the real recording positions. This distance varies depending on the speed. Within the meaning of the invention a vehicle can, for example, be a car, or may even be a bicycle with or without a trailer and, in the broadest sense, the vehicle may even be a pedestrian.

For example if, during recording, a vehicle travels at a speed of 50 km/h and the camera records at a rate of 24 images per second, the distance between two adjacent frames or images of the film lies in the range of 58 cm. If the vehicle travels at a slower speed, this distance decreases.

According to the invention this is taken into account in that, depending on the distance, areas of adjacent frames are used in order to be subsequently utilized for assembling the panoramic street image. These image areas become smaller the slower the vehicle moves during the recording of the film.

To achieve a balance as good as possible between adjacent images, according to the invention the distance is split up and, from a first frame only, an image strip is used that corresponds to a part of the distance aligned in the direction of the second frame, or rather its recording position. In other words, from a first frame, an image strip is used that is aligned from the zero position in a direction opposed to the direction of travel of the vehicle. In the subsequent frame, the exact opposite procedure is adopted by using an image strip that is aligned from the zero position in the direction of travel of the vehicle. Through this, a speed variation of the vehicle can also be compensated for in the best possible way and a highly precise, panoramic street image can be produced.

By preference, this analysis step is carried out for each frame of the film showing the street for which a panoramic street image is to be produced. In doing so, what is used from the entire film of the frames relevant in each case are image strips to the right and left of the zero position, which corresponds to the orthogonal of the viewing angle, in order to produce the panoramic street image. To avoid deviations at the beginning and end of a street, in the first and last frame of the film only those portions of the respective frames are used that start from the zero position in the direction of the course of the street. In other words, this means that of the first frame only, the area facing in the direction of travel of the vehicle is used and, by analogy, of the last frame showing the street, only the area facing from the zero position in a direction opposed to the direction of travel of the vehicle is used.

As a matter of course, the invention also renders it possible to use a continuous film that covers several streets at a time. However, for the evaluation it is essential that for the analysis steps implemented each time, areas of film showing one street are used. This means, for example, that the film can in each case be split accordingly beforehand.

The panoramic street image is assembled from the individual image strips of the frames which are chosen as described previously with reference to the analysis step.

The resultant panoramic street image corresponds with the length of the street. This is accomplished in that only areas located close to the zero position are substantially used to produce the panoramic street image, and therefore an optical recording error is not present, or is only present to a very limited extent. Consequently, it is not necessary for this recording error to be laboriously removed by way of calculation but instead it can be disregarded.

By preference, the first part of the distance and the second part of the distance each correspond to half of the distance. As a result, a simple evaluation can be carried out in the analysis step. Basically, it is also possible to choose the first and the second part of the distance to differ, e.g., depending on the speed or other environment variables. However, the more images per second are present in the film, the less important it is to split up the two parts of the distance differently, since the relative speed difference between both recordings of two adjacent frames is very small and can be disregarded.

It has been found that a simple calculation of the panoramic street image can be accomplished if the recording position is ascertained relative to the beginning of the street. On the one hand this offers the possibility that the distance can be determined relatively easily. On the other hand, it is thereby also possible to easily carry out a subsequent evaluation of the produced panoramic street image, as the beginning of the panoramic street image represents the zero point, or the origin, for further calculations, while the end of the panoramic street image represents the end position. In-between this, the panoramic street image is reproduced true to scale.

Advantageously, the distance used for ascertaining the image strips is converted into pixels of a frame. To this end, it is advantageous if the film is chosen such that e.g., a 10 cm distance corresponds to at least 35 pixels.

It is advantageous if, in the analysis step, a depth is assumed for the calculations that lies in the range between 3.5 m and 4.5 m, preferably around 4 m. Experience has shown that the depth, i.e., the perpendicular distance to the movement direction of the vehicle, of 4 m in relation to the recording position of the film is in most cases a good distance to ascertain the relevant information from a panoramic street image, and in particular for the production of static parking space data.

It has been found that for a highly precise panoramic street image it is advantageous if the film is chosen such that 1° capture angle in the horizontal has at least 25 pixels of a frame.

It is further preferred if at least for one frame, the pixels are ascertained that lie on the zero position of the frame. For example, this can be implemented in that during recording of the film, a house corner and/or a calibration means is driven past, and afterwards the corresponding frames are analyzed. It can be assumed, for example, that the two house walls forming a house corner are positioned such that a house wall is substantially situated at the angle of 90° to the street. If, during the production of the film, the vehicle is traveling at a slow speed past the house corner, the frame can be ascertained, at which point in time the house wall extending perpendicularly to the street can just no longer be seen—hence only the corner is visible. This then also enables a determination of the position in the frame this occurs at. This position in the frame constitutes the zero position. A similar procedure can also be applied to a corresponding calibration means that is placed at the curbside, for example.

Under some circumstances, it may be advantageous if the zero position is corrected by means of position and/or orientation data of the vehicle. Ideally, the vehicle moves parallel to the course of the street so that its movement direction substantially corresponds to the course of the street. By approximation, this also applies to the course of a street that describes a bend. If, however, the vehicle is required to avoid another stationary vehicle, for example, the viewing direction perpendicular to the direction of travel of the vehicle will no longer corresponds to a view perpendicular to the course of the street as the moving vehicle maneuvers to avoid contacting the stationary vehicle. This may possibly lead to distortions in the panoramic street image produced thereby. Compensation is possible if data on the course of the street are available, and at the same time information on the position and/or orientation of the vehicle are present in the film or as parallel data. Through this, such an avoidance maneuver can be captured in an evaluation, and arrangement can be made for the zero position to also be corrected in corresponding frames.

To achieve a panoramic street image of sufficient size and with good accuracy of detail, it is preferred if the film is chosen such that it has a capture angle in the vertical of at least 100° and in the horizontal of at least 50°. A film thus recorded in the upright format enables the relevant data required for producing static parking space information to be then ascertained easily from a panoramic street image structured in such a way.

Furthermore, the invention relates to a system for producing a spatially highly precise, localized panoramic street image of a street from a continuous film with location information recorded by means of a vehicle. This system has at least a computing unit suitable for executing the method according to any one of the pending claims. In other words, the method according to the invention can be implemented in any chosen system, and in particular in a computer system. In this case, for the evaluation it is only necessary to supply the system with the continuous film with the location information.

BRIEF DESCRIPTION OF DRAWINGS

The invention is explained in greater detail hereinafter by way of a schematic exemplary embodiment with reference to the Figures, wherein.

DETAILED DESCRIPTION

In the following description the recording situation of the continuous film for producing a highly precise, localized panoramic street image 60 according to the invention is explained in greater detail by means of FIGS. 1, 2 and 3. Also described is a camera 20 which is provided in a vehicle 40, and by means of which the continuous film is recorded.

Figure 1:
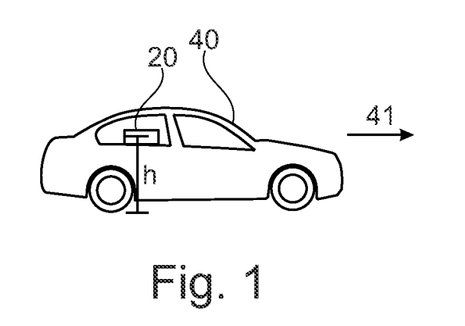
FIG. 1 is a side view of a vehicle when producing a continuous film.
Figure 2:
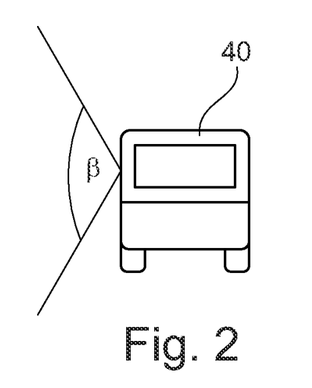
FIG. 2 is a front view of the vehicle when producing the continuous film.
Figure 3:
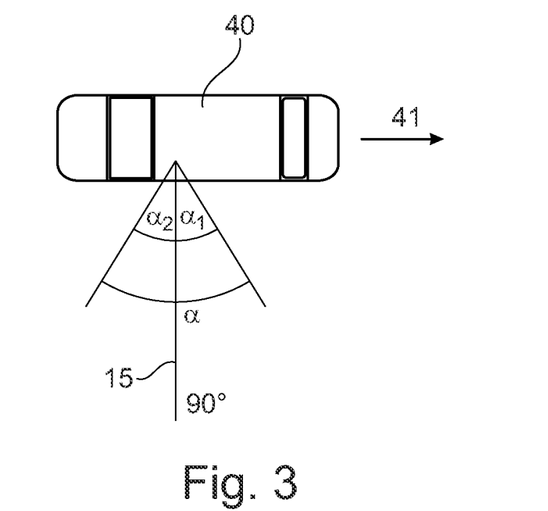
FIG. 3 is a plan view of a vehicle when producing the continuous film.

In FIG. 1 the vehicle 40 is illustrated in a side view, in FIG. 2 in a front view and in FIG. 3 in a view from above.

The camera 20 is firmly fixed in the vehicle 40 by means of a fastening device. This means that it is attached in the most robust and secure way possible in the vehicle 40.

Figure 6:
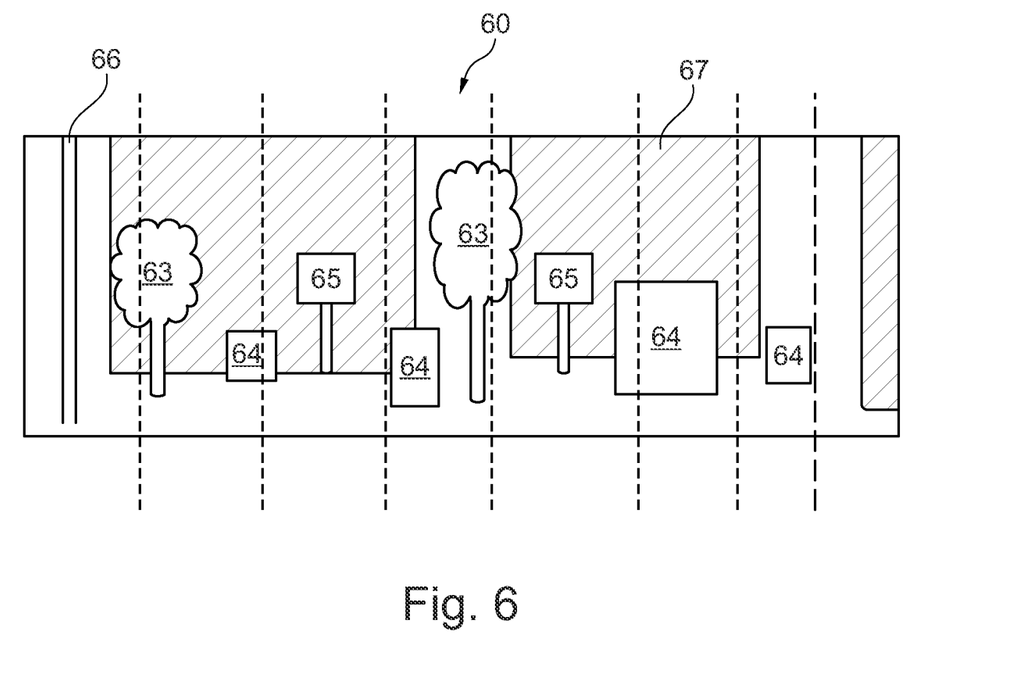
FIG. 6 is a highly simplified panoramic street image.

During travel of the vehicle 40, a continuous film is recorded with the camera 20, preferably at least in the 4K UHD standard, i.e., with at least 3,840 pixels by 2,160 pixels and 24 images per second. The objective is that, based on this film, a panoramic street image 60, as shown in FIG. 6, is produced in the most realistic and undistorted way possible by means of the method according to the invention.

This panoramic street image 60 can be used to ascertain static data for a parking space management system. For this purpose, what needs to be captured on the panoramic street image 60 is on the one hand the curbside, and on the other hand also signs which are located relatively close to the curbside, and on which information on parking times or the like may be displayed.

Therefore, the camera 20 is placed as close to the window of the vehicle 40 as possible. The camera is preferably arranged at a height h of approximately 1.2 meters, and by preference at a height of 1.21 meters. The camera can have a wide-angle lens. This can have a focal length of 20 mm, for example.

As can be taken from FIGS. 2 and 3, the camera is arranged to record in the upright format. This means that a camera angle $\beta$ that constitutes the vertical capture angle is larger than a camera angle $\alpha$ that indicates the horizontal capture angle. For instance, a wide-angle lens is chosen that has a vertical capture angle of around at least 100°, and more preferably 107°, and with a horizontal capture angle of over 55°, and more preferably 62°.

The camera 20 is arranged in such a way in the vehicle 40 that the vertical capture angle $\beta$ is substantially evenly distributed. This means that the same part of the capture angle $\beta$ lies in an area of over 90°, i.e., parallel to the street surface, and under 90°.

In contrast, for the horizontal capture angle $\alpha$, the camera 20 can be aligned differently. It is essential that the area of 90° to the direction of travel 41 is included in the capture angle $\alpha$. In the following this is referred to as "zero position" 15. The camera 20 can be arranged in such a way in the vehicle 40 that a larger part of the capture angle $\alpha$ is arranged facing forwards in the direction of travel 41. For instance, the capture angle $\alpha_1$ that describes the area from the 90° line towards the front in the direction of travel 41 can amount to 40°, preferably to over 45°. Accordingly, the capture area $\alpha_2$ that relates to the capture area of angle $\alpha$ aligned in a direction opposed to the direction of travel lies in the area of 17° with an entire capture area $\alpha$ amounting to 62°.

Such an arrangement proves to be advantageous as the vehicle moves in the direction of travel 41, as already outlined, and in this way the camera 20 is aligned in a forward-facing manner. This also enables the capturing of traffic signs that are aligned transversely to the street, for example.

Camera 20 preferably is a camera having a high light sensitivity, for example in the range of ISO 51200, and a shutter speed of 1:4,000 seconds, as well as an aperture of 5.6. The objective is that during recording, an area from as close as possible to the vehicle 40, e.g., from 1.25 meters up to infinity, is recorded as focused as possible so that these data can subsequently be evaluated as static data for a parking space management system.

Figure 4:
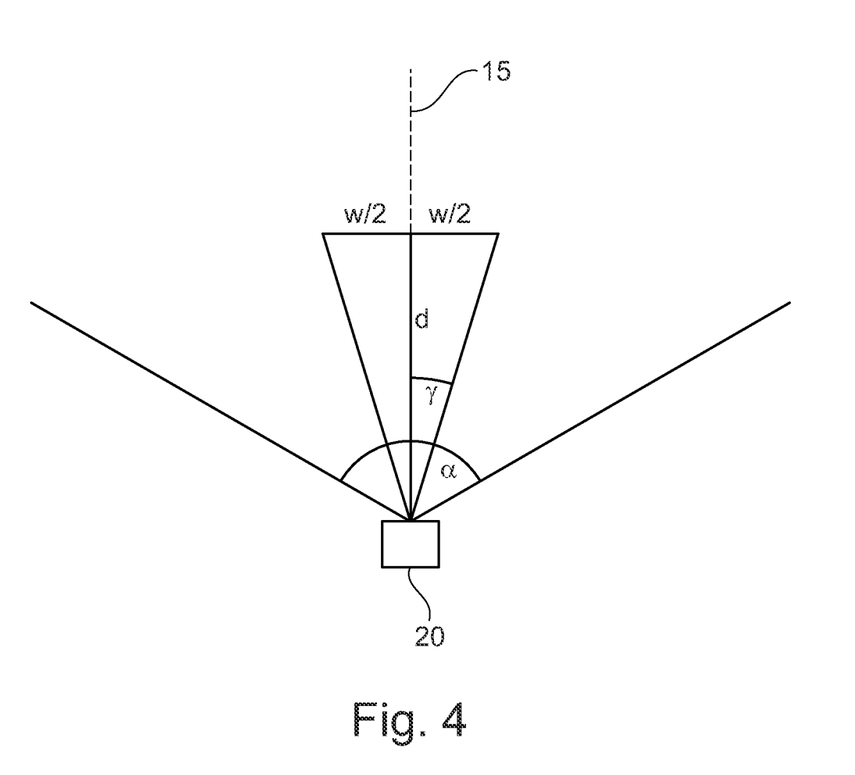
FIG. 4 is a diagram to illustrate the basic mathematical calculations.

With reference to FIG. 4, the necessary mathematical principles are now explained which, in accordance with the invention, render it possible to produce the highly precise, localized panoramic street image 60, from which static parking space information can subsequently be ascertained. In FIG. 4 the camera 20 is illustrated with its horizontal capture angle α.

A vehicle used to produce the continuous film travels in city traffic with an assumed maximum average speed of 50 km/h.

$$50\frac{km}{h} \approx 13.8\frac{m}{s}$$

In the case of a continuous film with 24 images per second, i.e., frames per second, this means that approximately every 58 cm of traveling route a new image is recorded.

13.8 m:24≈57.87 cm

Due to the fact that the traveling route is substantially parallel to the curbside, or rather to the recorded street, this means that from each frame of the continuous film an area corresponding to approximately 58 cm has to be extracted in order to produce the panoramic street image. This area decreases if the vehicle moves at a slower speed.

In FIG. 4 this area of 58 cm that is to be extracted from the respective frame is labeled w or rather w/2, in which case this area extends evenly around the zero position 15.

As a matter of course, without further details it is not possible to extract an area corresponding to 58 cm from a frame which is nothing else than an image structured of pixels. With a known resolution of the camera, e.g., with a horizontal capture angle α of 62°, which is displayed on 2,061 pixels, it can be determined that, per degree, 35 pixels are present. If the ascertainment is then made which capture angle is required for the desired distance w, then the necessary number of pixels can be ascertained by way of the angle.

According to the invention the realization was made that in the case of a standard recording of a street panorama in a film made from a vehicle, the median depth d amounts to approximately 4 m. Thus, by way of a tangent calculation as shown below, it is possible to ascertain that γ corresponds to approximately 4°. In other words, this means that approximately 8° of the capture angle has to be used to display a route that corresponds to approximately 58 cm at a distance of 4 m.

$$\tan(\gamma) = \frac{w/2}{d}$$

$$\gamma = \tan^{-1}\left(\frac{w/2}{d}\right) = \tan^{-1}\left(\frac{0.58/2}{4}\right) \approx 4.14°$$

Based on 35 pixels per degree corresponds

2γ≈8°=280 Pixels which are evenly distributed around the zero position 15. This means that for a distance of 58 cm, an image strip of a width of 280 pixels has to be extracted from a frame. The height of the image strip corresponds to the maximum vertical resolution of the frame. In the exemplary embodiment described here this amounts to approximately 3,820 pixels.

If the depth assumption of 4 m were incorrect by 50% this would result in the fact that a pixel on the edge of an image strip of 60 cm width shows a deviation of approximately 15 cm, i.e., by being actually located either at a distance of approximately 15 cm or 45 cm to the zero position instead of 30 cm as assumed. In the case of an assumption error of 25% the deviation amounts to approximately 7.5 cm. As a rule, these deviations can be disregarded and have little effect on the subsequent evaluation.

In the following, referring to FIG. 5, an illustration is given as to how the panoramic street image 60 is produced with the aid of individual image strips. For this, it is assumed that the vehicle 40 has moved along the line 31, and at each of the recording positions $P_1$, $P_2$, $P_3$, $P_4$ and $P_5$, one frame of the film was produced in each case. Here, the distance between the individual recording positions $P_1$, $P_2$, $P_3$, $P_4$ and $P_5$ is intentionally chosen to differ in order to depict different speeds of the vehicle 40. As a matter of course, such large differences would not occur in reality.

Figure 5:
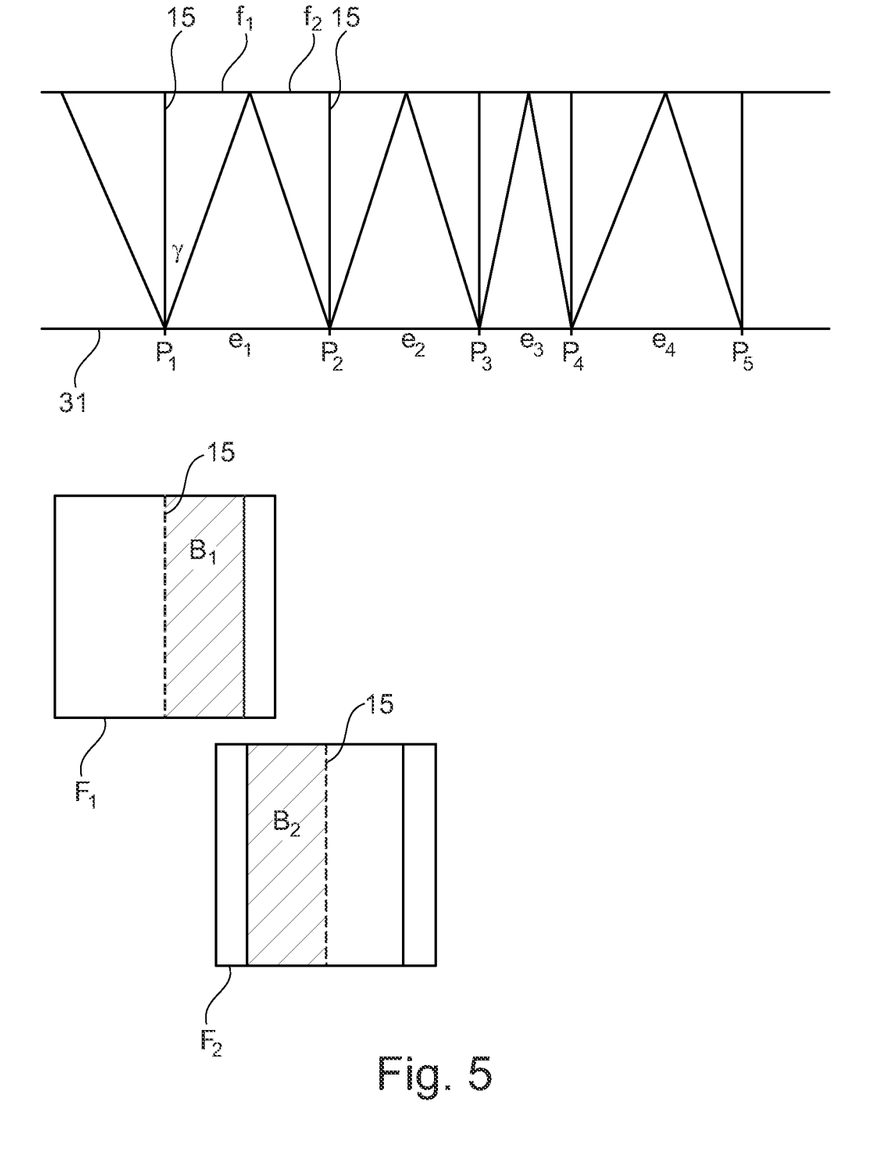
FIG. 5 is a diagram to explain the data used of a frame.

For the recording positions $P_1$ and $P_2$ shown in FIG. 5, a frame $F_1$ and $F_2$ of the film, in each case illustrated in a correspondingly simplified way, is additionally shown underneath the respective recording positions $P_1$ and $P_2$. For the sake of simplicity, the horizontal recording angle α according to FIG. 4 is not shown but only the horizontal recording angle γ necessary in each case, as explained previously with reference to FIG. 4

According to the method pursuant to the invention, initially the physical distance $e_1$ between the two recording positions $P_1$ and $P_2$ is ascertained. Then this distance $e_1$ between the two frames $F_1$ and $F_2$, which were recorded at the recording positions $P_1$ and $P_2$, is split into two parts $f_1$, $f_2$ of the distance $e_1$. In the exemplary embodiment illustrated here the distance $e_1$ is evenly distributed to both frames $F_1$ and $F_2$. Based on the previously explained calculation, the ascertainment can be made as to how many pixels in total have to be used for the respective image strip. The relevant pixels corresponding to half of the distance are now used in a first step to produce an image strip $B_1$ from the frame $F_1$ from the zero position in the direction of travel, in which case the entire height of the frame $F_1$ is, of course, utilized for the production of the image strip $B_1$.

By analogy, for the subsequent frame $F_2$, again half of the required pixels, in this case, however, from the zero position in the direction opposed to the direction of travel, is used to produce a corresponding image strip $B_2$. As illustrated in FIG. 5, this is carried out for all subsequent positions depending on the speed and therefore depending on the distance.

In this way, an image of the street can be produced which shows hardly any geometrical distortions and is therefore of high precision.

Finally, in FIG. 6 a highly schematic example of a panoramic street image 60 thus produced is illustrated. On the panoramic street image 60, not only individual objects 64 can be recognized, such as cars or trucks located on parking spaces, but also signs 65 can be recognized. On these signs 65 parking information can be present, for example. Likewise, complete streetlamps 66 or sections thereof are illustrated, for example. What is important here is that the curbside is present in order to ascertain a sufficient amount of data for static information for the parking management system. The objects shown hatched in FIG. 6 are, for example, houses 67 located in the background.

By means of dotted lines, the individual image strips are indicated which were used to produce the panoramic street image 60. For reasons of clarity these are not true to scale as the portion of a street of approximately 30 m illustrated here is assembled of approximately 100 individual image strips. Based on this panoramic street image 60, it is thus possible to measure distances between objects and ascertain therefrom information for static parking data. The measurement is effected in a highly precise way because, due to the applied method according to the invention, there are hardly any geometrical distortions. As a result, e.g., the distance between the streetlamp 66 and a tree 63 can be ascertained in pixels from the produced panoramic street image. If the number of pixels is known, the distance between the objects can be back-calculated by taking into account the previously explained calculation. This information is essential for the ascertainment of static parking space data.

By way of the method according to the invention and the system according to the invention it is possible to produce a highly precise, localized panoramic street image of a street.

The invention claimed is:

1. A method for producing a localized panoramic street image of a street from a continuous film with location information recorded by means of a vehicle, the method comprising:
    using a film which contains image data at an angle of 90° to a course of the street, which is referred to as zero position, and which has a capture angle of at least 20° in the horizontal, wherein at least 5° of the capture angle are present before and after the zero position;
    by means of the location information, ascertaining a recording position for each frame of the film;
    performing an analysis step including calculating a physical distance e1 between recording positions of a first frame, obtained at a recording position P1, and a subsequent frame obtained at a recording position P2, and repeating the calculating of the physical distance for every pair of subsequent adjacent pairs of the recording positions to determine a physical distance separating every said pair of adjacent ones of the recording positions;
    producing a panoramic street image by:
        creating an image strip of the first frame extending from the zero position in the direction of the recording position (P2) of the subsequent frame, which corresponds with a first part of the distance; and
        creating an image strip of the subsequent frame from the zero position in the direction of the recording position of the first frame, which corresponds with a second part of the distance;
        wherein the first and the second parts of the distance together correspond to the entire distance separating recording positions P1 and P2;
        wherein at least for one said frame, pixels thereof are ascertained that lie on the zero position of the at least one said frame; and
        wherein every subsequent pair of said image frames created is dependent on a distance separating a subsequent associated pair of adjacent ones of said recording positions, and every said subsequent pair of said image frames together correspond to the entire distance separating the two recording positions used to produce the pair of said image frames.

2. The method according to claim 1, wherein the analysis step is carried out for each frame of the film that shows the street.

3. The method according to claim 1, wherein in the case of the first and the last frame of the film, only the portions starting from the zero position in the direction of the course of the street are used in each case.

4. The method according to claim 1, wherein the panoramic street image is assembled from the image strips, wherein the panoramic street image corresponds with the length of the street.

5. The method according to claim 1, wherein the first part of the distance and the second part of the distance each correspond to half of the distance.

6. The method according to claim 1, wherein the recording position is ascertained relative to the beginning of the street.

7. The method according to claim 1, wherein the distance is converted into pixels of a frame.

8. The method according to claim 1, wherein the film is chosen such that a 10 cm distance corresponds to at least 35 pixels.

9. The method according to claim 1, wherein in the analysis step a depth in the range between 3.5 m and 4.5 m is used.

10. The method according to claim 1, wherein the film is chosen such that a 1° capture angle in the horizontal has at least 25 pixels.

11. The method according to claim 1, wherein the zero position is determined by means of a corner of at least one of a house wall or a calibration means.

12. The method according to claim 1, wherein the zero position is corrected by means of position and/or orientation data of the vehicle, in addition to using information pertaining to a course of a street being travelled by the vehicle.

13. The method according to claim 1, wherein the film is chosen such that it has a capture angle in the vertical of at least 100° and in the horizontal of at least 50°.

14. The method according to claim 1, further comprising a system for producing localized panoramic street image of a street from a continuous film with location information recorded by means of a vehicle with a computing unit, in accordance with the method.

15. The method of claim 1, further comprising a system for performing the method.

16. A method for producing a localized panoramic street image of a street from a continuous film with location information recorded by means of a vehicle, the method comprising:
    using a film which contains image data at a predetermined angle to a course of the street, which is referred to as zero position, and which has a predetermined horizontal capture angle, wherein predetermined subportions of the capture angle are present before and after the zero position;
    by means of the location information, ascertaining a recording position for each frame of the film;
    performing an analysis step including calculating a physical distance el between recording positions of a first frame and a subsequent frame;
    producing a panoramic street image by:
        creating an image strip of the first frame from the zero position in the direction of the recording position (P2) of the subsequent frame, which corresponds with a first part of the distance; and
        creating an image strip of the subsequent frame from the zero position in the direction of the recording position of the first frame, which corresponds with a second part of the distance;

wherein the first and the second part of the distance together correspond to the entire distance wherein;

wherein at least for one frame, pixels thereof are ascertained that lie on the zero position of the frames;

wherein in the case of the first and the last frame of the film, only the portions starting from the zero position in the direction of the course of the street are used in each case; wherein the panoramic street image is assembled from the image strips, wherein the panoramic street image corresponds with the length of the street; and wherein every subsequent pair of said image frames created is dependent on a distance separating a subsequent pair of adjacent ones of said recording positions, and every said subsequent pair of said image frames together correspond to the entire distance separating the two recording positions used to produce the pair of said image frames.

17. The method of claim 16, wherein the predetermined angle comprises an angle of 90°.

18. The method of claim 16, wherein the predetermined horizontal capture angle is at least 20°.

19. The method of claim 16, wherein the predetermined subportions of the capture angle present before and after the zero position are at least 5°.

20. A method for producing a localized panoramic street image of a street from a continuous film with location information recorded by means of a vehicle, the method comprising:

using a film which contains image data obtained at a predetermined angle which is non-parallel to a course of the street, which is referred to as zero position, and which has a capture angle of at least 20° in the horizontal, wherein at least 5° of the capture angle are present before and after the zero position;

by means of the location information, ascertaining a recording position for each frame of the film;

performing an analysis step including calculating a physical distance el between recording positions of a first frame and a subsequent frame;

producing a panoramic street image by:
creating an image strip of the first frame from the zero position in the direction of the recording position (P2) of the subsequent frame, which corresponds with a first part of the distance; and creating an image strip of the subsequent frame from the zero position in the direction of the recording position of the first frame, which corresponds with a second part of the distance;

wherein the first and the second part of the distance together correspond to the entire distance, and wherein the distances separating adjacent pairs of recording positions can vary such that the distances are non-uniform;

wherein at least for one frame, pixels are ascertained that lie on the zero position of the frames;

wherein the zero position is determined by means of a corner of at least one of a house wall or a calibration means;

wherein the zero position is corrected by means of position and/or orientation data of the vehicle, in addition to using information pertaining to a course of a street being travelled by the vehicle; and wherein every subsequent pair of said image frames created is dependent on a distance separating a subsequent pair of adjacent ones of said recording positions, and every said subsequent pair of said image frames together correspond to the entire distance separating the two recording positions used to produce pair of said image frames.

* * * * *